US009057542B2

(12) United States Patent
Schuit et al.

(10) Patent No.: US 9,057,542 B2
(45) Date of Patent: Jun. 16, 2015

(54) SNAP-ON STRUCTURAL CONNECTOR

(75) Inventors: Nathan Schuit, Edgewood, NM (US);
Jim Webb, Albuquerque, NM (US);
Chris M. Meier, Albuquerque, NM (US); Jason Mayfield, Albuquerque, NM (US); Juan Suarez, Albuquerque, NM (US)

(73) Assignee: UNIRAC, INC., Albuquerque, NM (US)

( * ) Notice: Subject to any disclaimer, the term of this patent is extended or adjusted under 35 U.S.C. 154(b) by 360 days.

(21) Appl. No.: 12/430,399

(22) Filed: Apr. 27, 2009

(65) Prior Publication Data
US 2010/0269447 A1 Oct. 28, 2010

(51) Int. Cl.
*E04D 13/18* (2014.01)
*F24J 2/52* (2006.01)
*F16B 9/02* (2006.01)
*F24J 2/46* (2006.01)

(52) U.S. Cl.
CPC .............. *F24J 2/5205* (2013.01); *F24J 2/5245* (2013.01); *F24J 2/5258* (2013.01); *F24J 2/526* (2013.01); *F24J 2/5256* (2013.01); *F24J 2/5254* (2013.01); *F24J 2/5207* (2013.01); *F16B 9/023* (2013.01); *F24J 2002/4665* (2013.01); *Y02E 10/47* (2013.01)

(58) Field of Classification Search
CPC ....... F24J 2/5254; F24J 2/5207; F24J 2/5245; F24J 2/5262; H02S 20/00
USPC ................. 52/220.6, 506.07, 506.08, 506.09, 52/506.1, 173.3; 362/148, 150
See application file for complete search history.

(56) References Cited

U.S. PATENT DOCUMENTS

| 2,833,199 | A | * | 5/1958 | Wakefield | 454/297 |
|---|---|---|---|---|---|
| 3,207,057 | A | * | 9/1965 | Brown et al. | 454/301 |
| 3,280,530 | A | * | 10/1966 | Rothenbach | 52/838 |
| 3,574,964 | A | * | 4/1971 | Ownbey | 40/618 |
| 3,742,674 | A | * | 7/1973 | Lang | 52/666 |
| 3,778,537 | A | | 12/1973 | Miller | |
| 4,452,021 | A | | 6/1984 | Anderson | |
| 4,480,360 | A | | 11/1984 | Brugman et al. | |
| 4,569,175 | A | * | 2/1986 | Abciuk | 52/506.07 |
| 4,794,745 | A | * | 1/1989 | Platt et al. | 52/506.07 |
| 4,848,054 | A | * | 7/1989 | Blitzer et al. | 52/506.07 |
| 4,926,606 | A | * | 5/1990 | Hanson | 52/506.07 |
| 5,253,462 | A | * | 10/1993 | Blitzer et al. | 52/506.07 |
| 5,265,393 | A | * | 11/1993 | Bischel et al. | 52/461 |

(Continued)

FOREIGN PATENT DOCUMENTS

| DE | 10 2007 023 177 A1 | 3/2008 |
|---|---|---|
| DE | 20 2007 016 011 U1 | 5/2008 |

(Continued)

OTHER PUBLICATIONS

PCT/US10/032012 International Search Report (mailed Jun. 14, 2010) (2 pages).

(Continued)

*Primary Examiner* — Basil Katcheves
*Assistant Examiner* — Joshua Ihezie
(74) *Attorney, Agent, or Firm* — Crowell & Moring LLP (57) ABSTRACT

A connector is provided and includes a first and second side wall that are connected by a base. The side walls have recesses such that a structural member's protrusions can be interposed between the side wall's recesses and snapped into place to connect the connector to the structural member.

19 Claims, 8 Drawing Sheets

(56) References Cited

U.S. PATENT DOCUMENTS

| | | | |
|---|---|---|---|
| 5,613,759 A * | 3/1997 | Ludwig et al. | 362/149 |
| 5,653,412 A | 8/1997 | Martorano et al. | |
| 5,979,134 A * | 11/1999 | Neff | 52/506.07 |
| 6,012,691 A | 1/2000 | van Leeuwen et al. | |
| 6,155,006 A | 12/2000 | Mimura et al. | |
| 6,158,186 A * | 12/2000 | Feller | 52/506.06 |
| 6,536,173 B2 * | 3/2003 | Rebman | 52/465 |
| 6,651,399 B2 * | 11/2003 | Li | 52/506.07 |
| 6,779,315 B1 * | 8/2004 | Bongio et al. | 52/506.07 |
| 7,260,919 B1 * | 8/2007 | Spransy et al. | 52/586.1 |
| 7,287,733 B2 * | 10/2007 | Bongio et al. | 248/235 |
| D569,997 S * | 5/2008 | McPherson | D25/119 |
| 7,374,057 B2 * | 5/2008 | Hendrickson et al. | 220/3.8 |
| 7,469,511 B2 * | 12/2008 | Wobber | 52/474 |
| 7,752,821 B2 * | 7/2010 | Jankovec et al. | 52/506.07 |
| 2002/0112438 A1 * | 8/2002 | Little | 52/702 |
| 2003/0070368 A1 * | 4/2003 | Shingleton | 52/173.3 |
| 2003/0097809 A1 * | 5/2003 | Li | 52/506.07 |
| 2003/0106276 A1 * | 6/2003 | Tallman et al. | 52/506.06 |
| 2003/0177735 A1 * | 9/2003 | Seeba et al. | 52/726.2 |
| 2003/0213199 A1 * | 11/2003 | Bongio et al. | 52/506.01 |
| 2005/0045785 A1 | 3/2005 | Cohen | |
| 2009/0166494 A1 | 7/2009 | Bartelt-Muszynski et al. | |
| 2012/0085394 A1 * | 4/2012 | McPheeters et al. | 136/251 |
| 2013/0048815 A1 * | 2/2013 | Wagner et al. | 248/228.1 |

FOREIGN PATENT DOCUMENTS

| | | |
|---|---|---|
| EP | 1 722 111 A1 | 11/2006 |
| JP | 8-93098 A | 4/1996 |
| WO | WO 93/17197 A1 | 9/1993 |

OTHER PUBLICATIONS

UniRac, CLICKSYSTm Brochure, "Delivering value through innovation." May 4, 2009, Available online at http://www.clicksys-beam.com/downloads/clicksys-sales-brochure.pdf) (3 pages).

European Search Report dated Mar. 31, 2014 (Five (5) pages).

Japanese Office Action dated Nov. 25, 2014 (Three (3) pages).

* cited by examiner

SNAP-ON STRUCTURAL CONNECTOR

FIELD OF EMBODIMENTS OF THE INVENTION

Non-limiting embodiments of the present invention generally relate to a connector for use in a modular structural framing system. In one implementation, the modular structural framing system can be rapidly assembled without additional fasteners, hardware or tools when the connector is used. Also, in some embodiments, the connector can be used to connect the modular structural framing system to a base foundation, such as a roof, floor, ceiling or wall.

BACKGROUND OF EMBODIMENTS OF THE INVENTION

Connectors are used to connect or join two separate objects. For example, in the context of a solar panel mounting system, a connector may be used to attach a solar panel to a structural member to form a mounting assembly. The connector of the mounting assembly may be fastened to or mounted upon a base foundation, such as a roof, floor, ceiling, wall, frame, beam, pole or other structural member.

In some implementations, connectors require the application of physical force by an installer to connect or fasten the solar panel and structural members together, usually by using additional hardware or fasteners (such as nuts, bolts, rods, screws, washers, etc.) and/or tools. Thus, the installer of a solar panel mounting system will need to use both hands to connect the solar panel to the structural member: one hand to position the panel, connector and structural member, and the other hand to manipulate the hardware or fasteners and/or tools. Consequently, connectors that require the application of physical force as well as additional components (i.e., the hardware, fasteners or tools) make the installation of solar panel mounting system laborious, time-consuming and cumbersome.

As the use of solar panels to generate all or part of the electrical needs for home and industry increases, demand has escalated for a solar panel mounting system that is easy to install. For instance, connectors that do not require hardware, fasteners or tools to connect the solar panels with the structural member facilitate the installation or assembly process. In some cases, connectors should be capable of withstanding high force resistance (e.g., wind, weight, etc.) once they are installed, as well as being removable and reusable if the installer should choose. Furthermore, in some contexts, providing connectors with a variety of structural shapes would be useful.

SUMMARY OF EMBODIMENTS OF THE INVENTION

An object of an illustrative, non-limiting embodiment of the present invention overcomes the above and other problems and disadvantages associated with the current design of structural connectors. Also, the present invention is not required to overcome the disadvantages described above, and exemplary embodiments of the present invention may overcome other disadvantages or may not overcome any disadvantage.

One embodiment relates to a connector having a first side wall having a first ridge and a first flange, a second side wall having a second ridge and a second flange, and a base connecting the first and second side walls, wherein the first side wall opposes the second side wall, wherein the first ridge is disposed between the first flange and the base, wherein the second ridge is disposed between the first flange and the base, and wherein the connector is adapted to connect to a structural member by inserting a third flange of the structural member between the first ridge and first flange of the first side wall and inserting a fourth flange of the structural member between the second ridge and second flange of the second side wall.

In another embodiment, the first side wall, the second side wall and the base of the connector are of unitary construction.

In another embodiment, the connector is made from a composition selected from a group consisting of steel, aluminum and plastic.

In some embodiments, the base of the connector extends laterally in one or two directions for a distance that equals the height of the side walls. In still yet another embodiment, these base extensions have at least one aperture.

In yet another embodiment, the first side wall, the second side wall and the base form either a V-shape or U-shape.

In yet another embodiment, the connector has a vertical structural support extending from the base between the first and second side walls and in the same direction as the side walls.

While several embodiments of the connector are explained in connection with securing a solar panel to a solar panel mounting system, the use of the connector is not limited to such an application and the connector may be used in a wide variety of other applications that will be apparent to one of ordinary skill in the art upon reading the present application.

BRIEF DESCRIPTION OF THE DRAWINGS

The above and other objects and advantages of illustrative, non-limiting embodiments of the present invention will become more apparent by describing them in detail with reference to the attached drawings.

DETAILED DESCRIPTION OF THE INVENTION

The following description of illustrative non-limiting embodiments discloses specific dimensions, configurations, components, and processes. However, the embodiments are merely examples of the present invention, and thus, the specific features described are merely used to more easily describe such embodiments and to provide an overall understanding for the present invention. Accordingly, one skilled in the art will readily recognize that the present invention is not limited to the specific embodiments described below. Furthermore, the descriptions of various dimensions, configurations, components and processes of the embodiments that would have been known to one skilled in the art are omitted for the sake of clarity and brevity.

Figure 1:
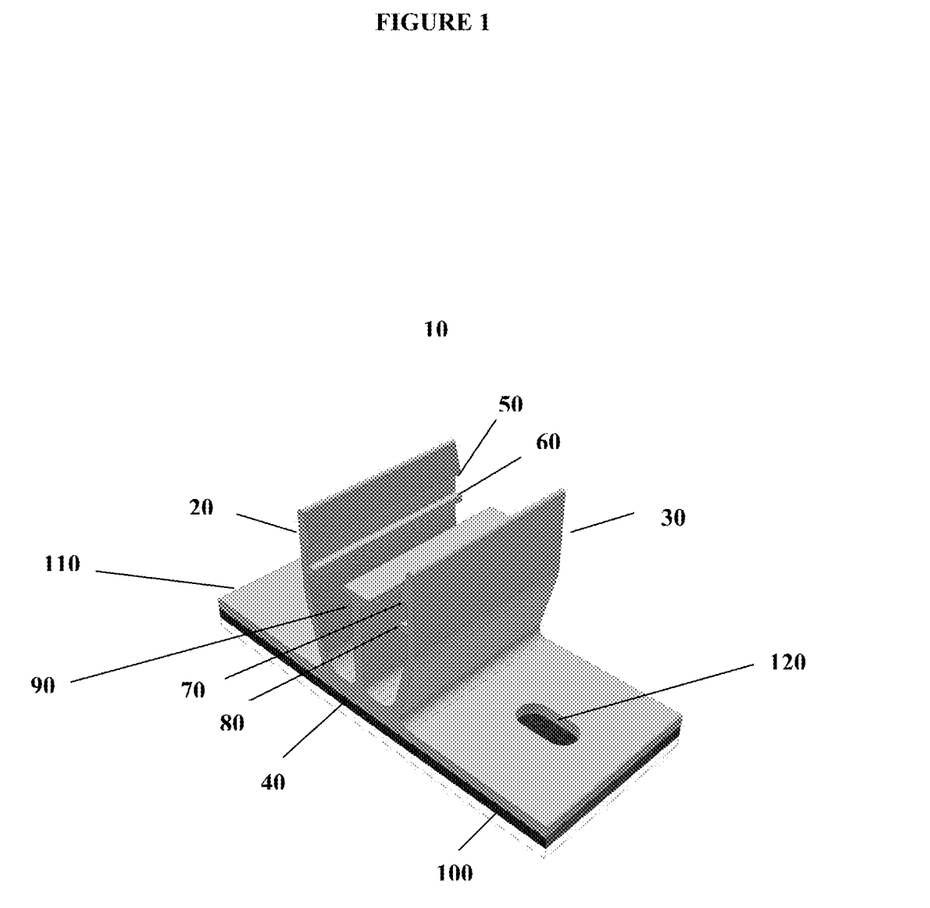
FIG. 1 shows a perspective view of an embodiment of a connector that has two base extensions extending from opposite sides of the base.

A non-limiting embodiment of a connector 10 is depicted in FIG. 1. The connector 10 comprises a first side wall 20, a second side wall 30 and a base 40. A first flange 50 and a first ridge 60 of the first side wall 20 form a crevice or recess into which a structural member can be inserted. The second side wall 30 opposes the first side wall 20, and a second flange 70 and second ridge 80 oppose the first flange 50 and first ridge 60.

Also, as noted in FIG. 1, a crevice or recess is formed between the flange 50 and ridge on the first side wall 20. However, the crevice or recess may be created by forming a groove, bore, or other indentations into the side wall 20 or may be formed between various protrusions extending from the side wall 20. The crevice or recess in the second side wall 30 likewise can be formed in various manners. In any event, upon reading the present application, one skilled in the art will realize that the crevices or recesses in the side walls 20 and 30 can be formed in many different ways, some of which may depend upon the particular application of the connector 10.

The first side wall 20 and second side wall 30 connect at the base 40. In this embodiment, there is a structural support 90 which extends from the base 40 upwards in the direction of the side walls 20 and 30. In one example, the height of the structural support 90 is the same height as the first ridge 60 and second ridge 80. Of course, the structural support 90 can have different orientations and different heights depending on the components that the connector 10 is designed to connect. For example, the structural support 90 may extend from one or both side walls 20 and 30, and depending on the application, the connector 10 may have more than one structural support 90. Also, the connector 10 may not have any structural supports 90.

A connector 10 having a structural support 90, as shown in FIG. 1, may be referred to as a "W-shaped" connector 10 since the side walls 20 and 30 and the structural support 90 generally form the letter "W." Connectors 10 that do not have the structural support 90 may be referred to as "V-shaped" or "U-shaped" connectors 10.

In this non-limiting embodiment, the connector 10 also has two base extensions 100 and 110 extending from the base 40 of the connector 10. There may be an aperture 120 in the base extensions 100 and 110 that allows the connector 10 to be mounted to a base foundation.

Figure 2:
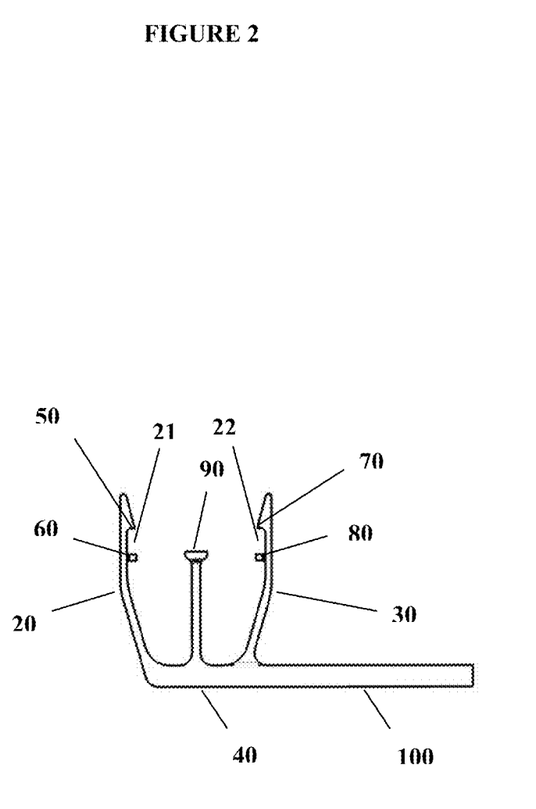
FIG. 2 is a diagram of another embodiment of a connector.
Figure 3:
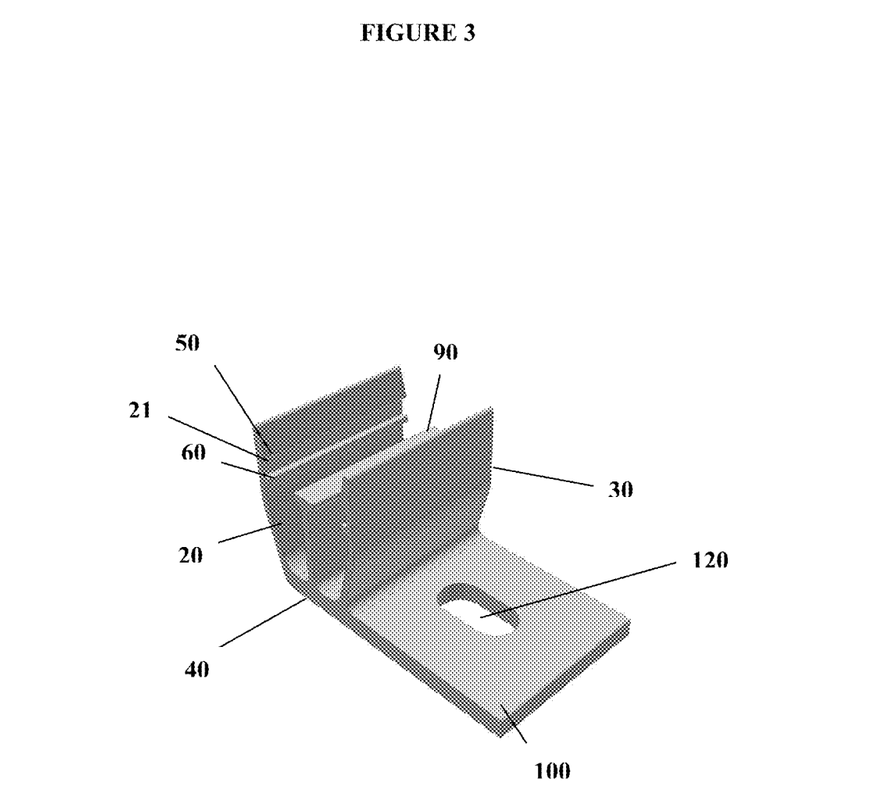
FIG. 3 shows a perspective view of the connector shown in FIG. 2.

FIG. 2 is a cross-sectional view of an example of a connector 10. As shown, the first flange 50 and second flange 70 of the first and second side walls 20 and 30 oppose each other. A first crevice or recess 21 is formed between the first flange 50 and first ridge 60, and a second crevice or recess 22 is formed between the second flange 70 and second ridge 80. In this embodiment, there is only one base extension 100 extending from the base 40 and the height of the structural support 90 is roughly the same as the height of the ridges 60 and 80. FIG. 3 provides a perspective view of the connector 10 depicted in FIG. 2.

Figure 4A:
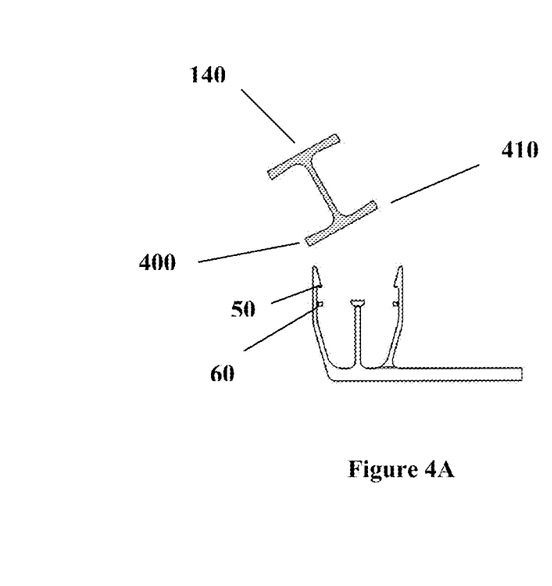
FIGS. 4A-4C depict an embodiment of a connector being attached to a structural member.
Figure 4B:
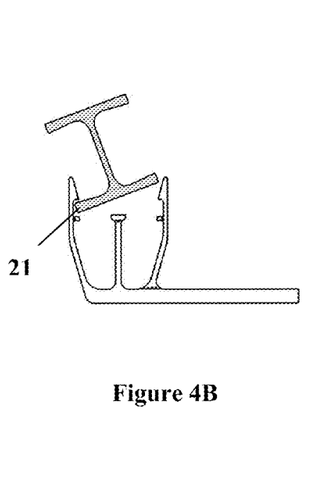
Figure 4C:
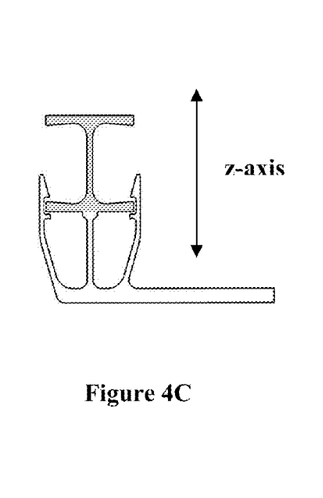

FIGS. 4A-4C show an example of how a structural member 140 (e.g., an I beam) can be connected to the connector 10. As shown in FIG. 4B, a flange 400 of a structural member 140 is inserted at an angle into the crevice or recess 21 formed by the first flange 50 and first ridge 60 of the first side wall 20 of the connector 10. The structural member 140 is then twisted along its longitudinal axis to engage a flange 410 of the structural member 140 between the second flange 70 and second ridge 80 of the second side wall 30 as shown in FIG. 4C.

While FIGS. 4A-4C show the flanges 400 and 410 of the structural member 140 inserted into the crevice or recess 21 of the connector 10, upon reviewing the present application, one of ordinary skill in the art will understand that a structural member may have protrusions that can engage a crevice or recess of a connector. Similarly, in another embodiment, a connector may have protrusions on its side walls, rather than recesses, that can be inserted into a crevice or recess of a structural member.

As depicted in FIGS. 4A-4C, the structural member 140 is manipulated while the connector 10 remains stationary to connect the connector 10 and the structural member 140. Alternatively, the connector 10 may be moved so that the crevice 21 formed by the first flange 50 and first ridge 60 of the first side wall 20 engages the flange 400 of the structural member 10 at an angle. The connector 10 then may be twisted along the long axis of the structural member 140 to engage the second flange 60 and second ridge 80 of the second side wall 30 with the flange 410 of the structural member 140. In addition, the connector 10 and structural member 140 can be connected by manipulating both the connector 10 and the structural member 140.

In a non-limiting example, once snapped into place (as shown for example in FIG. 4C), the connector 10 is designed for maximum force resistance along its z-axis. In another exemplary implementation, the connector 10 is mechanical in nature and does not require any additional chemicals or adhesives to maintain or enhance the connection between the connector 10 and structural member 140. Upon testing an embodiment of the connector 10, preliminary results indicate that approximately 20 pounds of force is required to connect the connector 10 and the structural member 140 together. Also, in the test, approximately 2,000 pounds along the z-axis was required to separate the connector 10 and structural member 140. Of course, the precise designs and tolerances of the connector 10 may depend on the materials from which it is made, the types of structural members 140 to which it is connected, and the applications in which it is used.

Figure 5:
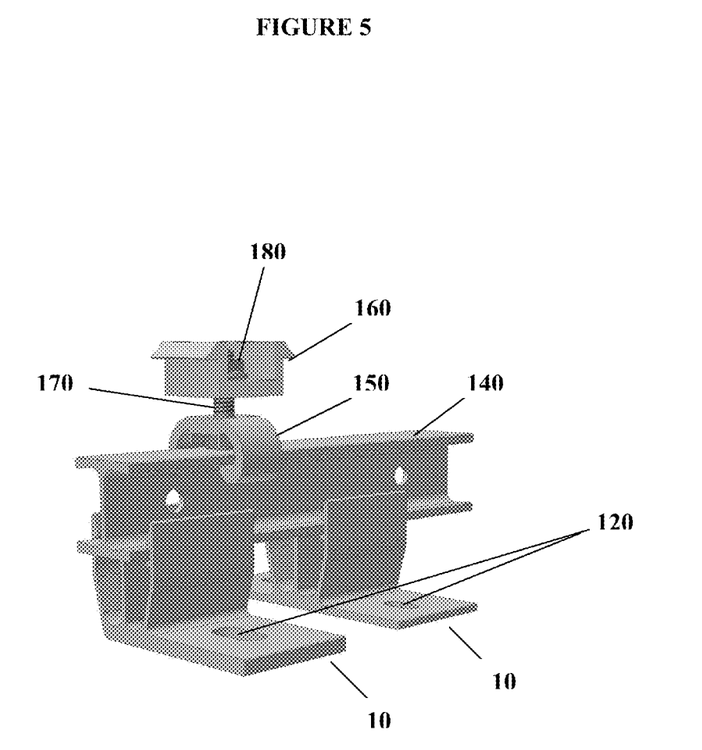
FIG. 5 shows a perspective view of additional embodiments of connectors attached to a structural member along with a slider and a mid-clamp.
Figure 6A:
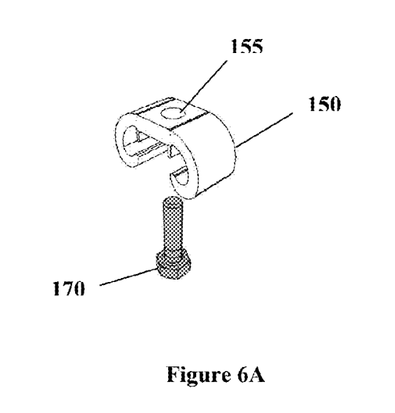
FIGS. 6A-6D show examples of how a slider may be attached to a structural member and how a panel may be top mounted.
Figure 6B:
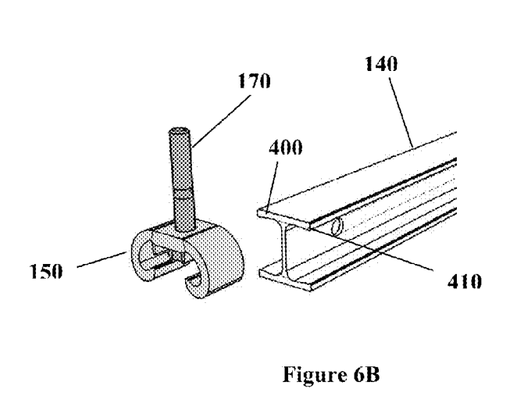
Figure 6C:
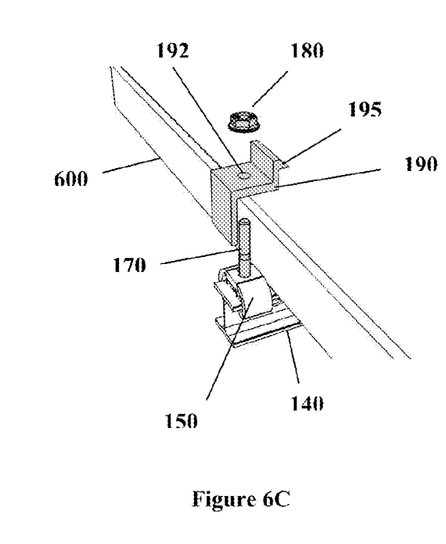
Figure 6D:
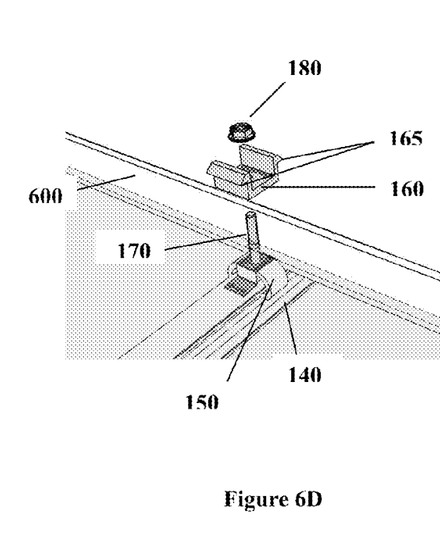

FIG. 5 shows a non-limiting embodiment having two connectors 10 attached to a structural member 140 for a solar panel top mounted assembly. Attached to the structural member 140 is a slider 150, mid-clamp 160, a bolt 170 and a nut 180. FIGS. 6A-6D show an example of how the top mounted assembly may be assembled. In FIG. 6A, prior to attaching the slider 150 to the structural member 140, the bolt 170 is inserted into an aperture 155 located in the center of the slider 150. Then, in FIG. 6B, the slider 150 slides onto the flanges 400 and 410 of the structural member 140 and uses the flanges 400 and 410 as guide rails.

In one embodiment, to top mount the solar panels 600, either an end clamp 190 (FIG. 6C) or a mid-clamp 160 (FIG. 6D) can be used. In one example, an end clamp 190 is used when only one solar panel 600 will be mounted on one side of the slider 150, whereas a mid-clamp 160 is used when solar panels 600 will be mounted on both sides of the slider 150. In one embodiment, the end clamp 190 has one flange 195, and the mid-clamp 160 has two flanges 165 which then engage the solar panels 600. An aperture 192 in the end clamp 190 or mid-clamp 160 allows the bolt 170 to pass through so that the nut 180 can be screwed onto the bolt 170 to secure the solar panels 600 between the flanges 195 or 165 of the end clamp 160 or mid-clamp 195 and the structural member 140.

Figure 7A:
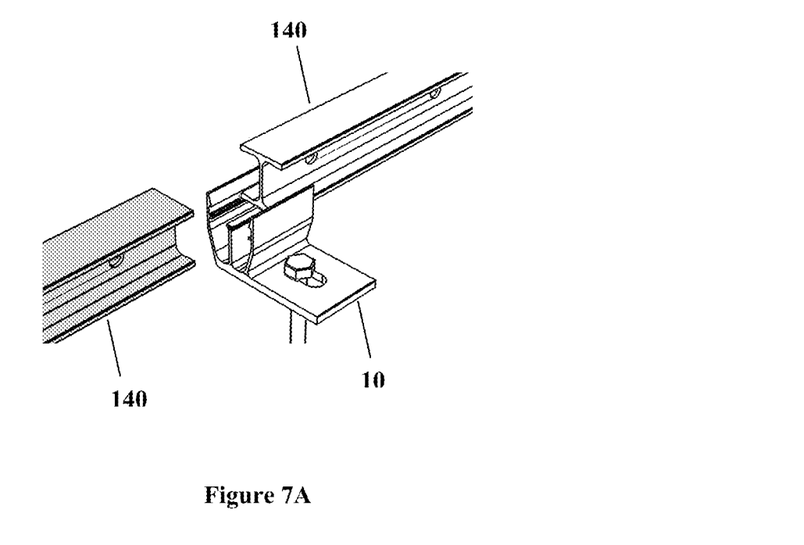
FIGS. 7A-7B show an example of how a connector can be used to join two structural members together.
Figure 7B:
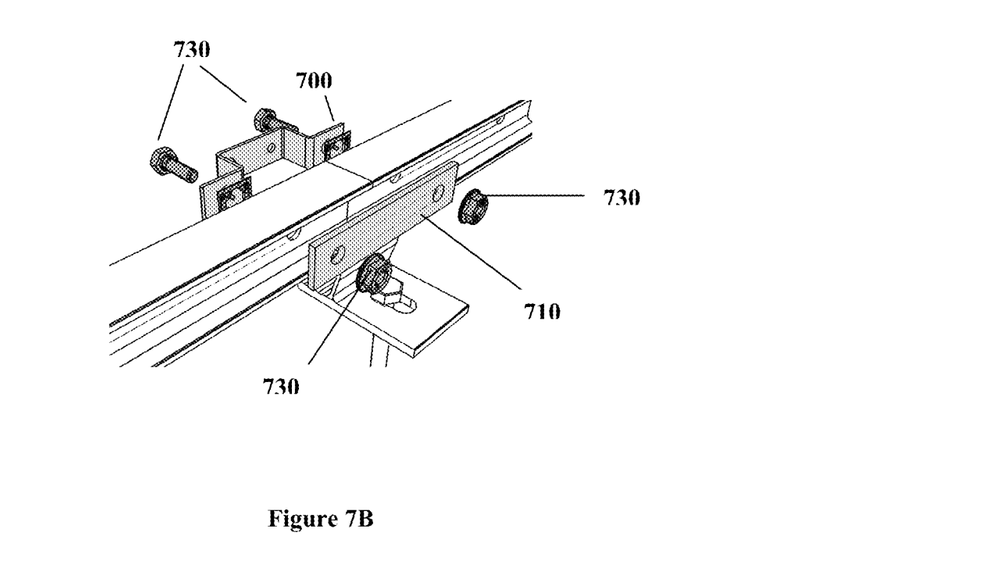

FIGS. 7A-7B depict a non-limiting embodiment of a connector 10 that is used to join two structural members 140 together. In one implementation, to maintain the rigidity of the structural members 140, a rail splice 700, a rail plate 710 and fasteners (e.g., bolts and nuts) 730 may be used. As shown in FIG. 7A, the two structural members 140 are slid into or otherwise engaged with the connector 10. Then, in FIG. 7B, the bolts 730 pass through holes in the rail splice 700, the structural member 140, and the rail plate 710, and nuts 730 screw onto the bolts 730 to join the structural members 140. One of ordinary skill in the art will understand, after reading the present specification, that different types of components, besides components 730, 700 and 710 can be used to join the structural members 140.

Figure 8A:
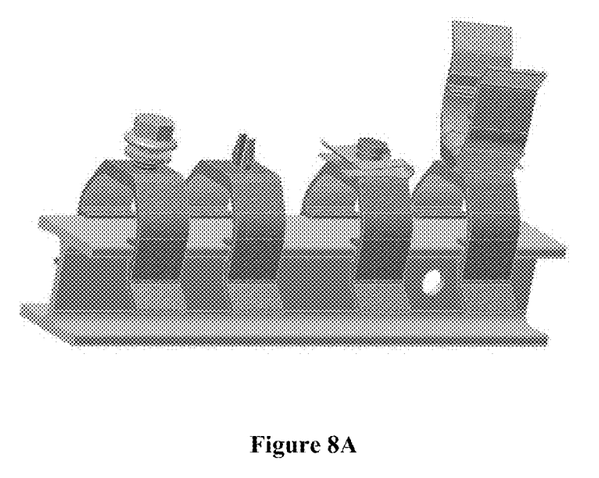
FIGS. 8A-8B depict various embodiments of connectors attached to a structural member.
Figure 8B:
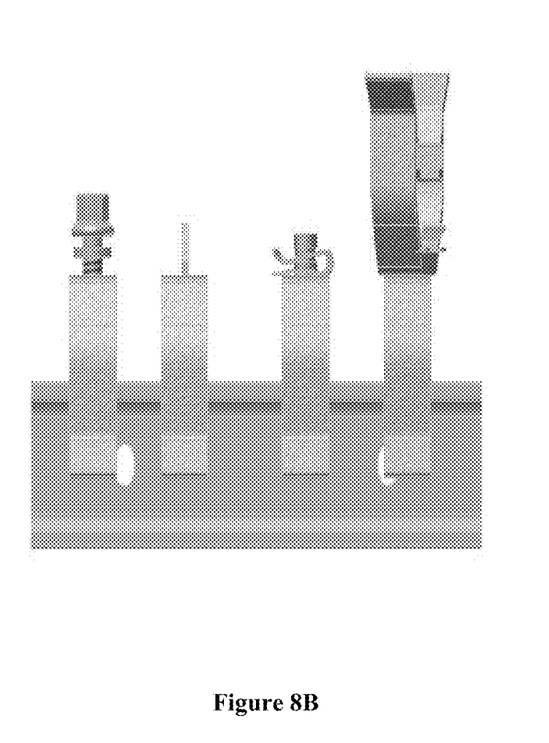

FIGS. 8A-8B show additional embodiments of a connector 10 attached to a structural member 140. These embodiments depict connectors 10 that contain or are coupled to different attachments for connecting the connector 10 to a base foundation or other structure. Examples of the attachment include, but are not limited to, screws, bolts, connectors disclosed herein, rivets, adhesives, c-clips, cotter pins, e-clips, snap rings, circlips, and self-locking clips.

In another embodiment of the invention, the connectors 10 can be used to apply cladding to the structural members 140 to protect the base structure. In a specific, non-limiting example, connectors 10 may also be used to fasten two structural members 140 together. Connectors 10 can also secure any module to a structural member 140, provided that the module also possesses a mounting hole.

In some embodiments, the connectors 10 may be attached to, or mounted on, the base foundation prior to assembly of the mounting structure. In these embodiments, connectors 10 having base extensions extending from its base 40 are needed. The base extensions 100 may have an aperture 120 sufficient to fit a bolt, screw, nail or other type of fastener, such that the connector 10 can be attached to the base foundation. Connectors 10 having base extensions 100 may have either one, two three or four base extensions extending laterally from the base 40.

The base extensions 100 extending laterally from the base 40 may be of any length. However, in some non-limiting instances, the strength of the connector 10 will be inversely proportional to the length of the base extension 100. In other words, in these cases, longer extensions may weaken the ability of the connector 10 to support the weight of the mounting assembly. If connectors 10 with longer base extension(s) 100 are needed for a mounting assembly, such connectors 10 may require that the base extension(s) 100 be thicker to compensate for the weakness associated with the longer base extensions. In another embodiment, the base extensions are at least equal to the height of the side walls, as measured from the base. One of ordinary skill in the art will understand, after reading the present specification, that the base extensions can vary in length and geometric shapes.

In some embodiments, the connectors may be of unitary construction. The unitary construction allows the mounting assembly to be easily installed. Furthermore, the connectors may be made from metals such as, but not limited to, steel, aluminum, brass, chrome, and copper. Alternatively, the connectors can be constructed from plastic, including plastics reinforced with carbon and ceramic. In addition, the connectors may also be made from synthetic polymers, including but not limited to vinyl, polycarbonate and polyvinyl chloride. One of ordinary skill in the art can also make connectors from composite materials consisting of, for example, two metals, metals and non-metals, and metals and ceramic.

Connectors disclosed herein may be manufactured having a variety of structural shapes. For example, different shaped connectors may be designed for and used with I-beams, rectangular and square tubes, C-channels, U-channels, J-channels, L sections, and other profiles with and without stiffeners. The snap function would change location but still operate in the same manner. In addition to the aforementioned structural shapes, embodiments of the connectors may take any shape so long as the structural member has at least two flanges for the connector's flanges and ridges to engage. In other embodiments, a connector may have only one flange and one ridge on one side wall and not have a flange or ridge on the opposing side wall. In yet another embodiment, the connector may have a flange (and no ridge) on one side wall and a ridge (and no flange) on the other side wall.

The connectors described above can be used for several purposes, including but not limited to mounting solar racking products, wall shelving supports, closet organizers, electrical conduit fastening systems, bathroom fixtures, cabinet hanging systems, television mounting assemblies, satellite television mounting assemblies, sign structures, cubicle systems, picture hanging brackets, and knockdown furniture systems.

It is to be understood that while the invention has been described in conjunction with the detailed description thereof, the foregoing description is intended to illustrate and not limit the scope of the invention, which is defined by the scope of the appended claims. Other aspects, advantages and modifications are without the scope of the following claims.

What is claimed is:

1. A solar panel assembly, comprising:
   a connector including:
   a base;
   a first side wall including a first recess, wherein the first side wall extends from the base;
   a second side wall including a second recess, wherein the second side wall extends from the base; and
   a structural support formed integrally with the base and extending from the base and between the first side wall and the second side wall wherein the structural support extends from the base to the first and the second recesses of the first and the second side walls, respectively;
   a structural member, wherein the structural member includes a contiguous member and wherein in a configuration where the structural member is connected to the connector a first end of the contiguous member is received in the first recess and a second end of the contiguous member is received in the second recess; and
   a solar panel mounted on the structural member.

2. The solar panel assembly according to claim 1, wherein a base extension extends from the base and wherein an aperture is included in the base extension.

3. The solar panel assembly according to claim 1, wherein a first base extension and a second base extension extend from the base in opposing directions and wherein a first aperture is included in the first base extension and a second aperture is included in the second base extension.

4. A solar panel assembly, comprising:
   a connector including:
   a base;
   a first side wall including a first recess, wherein the first side wall extends from the base;
   a second side wall including a second recess, wherein the second side wall extends from the base; and
   a structural support formed integrally with the base and extending from the base;
   a structural member, wherein the structural member includes a contiguous member, wherein a first end of the contiguous member is receivable in the first recess, wherein a second end of the contiguous member is receivable in the second recess, and wherein the contiguous member rests on the structural support when the first end of the contiguous member is received in the first recess and the second end of the contiguous member is received in the second recess; and a solar panel mounted on the structural member.

5. The solar panel assembly according to claim 4, wherein the structural member is an I-beam.

6. The solar panel assembly according to claim 4, wherein each of the first side wall and the second side wall have a first portion that extends non-perpendicularly with respect to the base and a second portion that extends perpendicularly with respect to the base.

7. The solar panel assembly according to claim 4, further comprising a rail plate and a rail splice, wherein the rail plate and the rail splice are engageable with the structural member.

8. The solar panel assembly according to claim 4, wherein the base extends contiguously between the first side wall and the second side wall.

9. The solar panel assembly according to claim 4, wherein the first side wall and the second side wall are curved.

10. The solar panel assembly according to claim 4, wherein a base extension extends from the base and wherein an aperture is included in the base extension.

11. The solar panel assembly according to claim 4, wherein a first base extension and a second base extension extend from the base in opposing directions and wherein a first aperture is included in the first base extension and a second aperture is included in the second base extension.

12. The solar panel assembly according to claim 4, wherein the first recess is defined by a first flange and a first ridge and wherein the second recess is defined by a second flange and a second ridge.

13. The solar panel assembly according to claim 12, wherein the first flange and the second flange each include a slanted wall.

14. A mounting system, comprising:
a connector including:
  a base;
  a first side wall including a first recess, wherein the first side wall extends from the base; and
  a second side wall including a second recess, wherein the second side wall extends from the base;
a structural member, wherein the structural member includes a contiguous member, wherein a first end of the contiguous member is receivable in the first recess, and wherein a second end of the contiguous member is receivable in the second recess;
a slider slidably engageable with the structural member; and
a clamp attachable to the slider, wherein the clamp is U-shaped and includes two flanges that extend in opposite directions.

15. The mounting system according to claim 14, wherein the clamp and the slider each define a respective recess.

16. A mounting system, comprising:
a connector including:
  a base;
  a first side wall including a first recess, wherein the first side wall extends from the base; and
  a second side wall including a second recess, wherein the second side wall extends from the base;
a structural member, wherein the structural member includes a contiguous member, wherein a first end of the contiguous member is receivable in the first recess, and wherein a second end of the contiguous member is receivable in the second recess;
a slider slidably engageable with the structural member; and
a clamp attachable to the slider;
wherein the clamp and the slider each define a respective recess and wherein an attachment device extends through the respective recesses of the clamp and the slider.

17. The mounting system according to claim 16, wherein the base extends contiguously between the first side wall and the second side wall.

18. The mounting system according to claim 16, wherein the first side wall and the second side wall are curved.

19. The mounting system according to claim 16, wherein the clamp includes a flange.

* * * * *